United States Patent [19]

Seitz et al.

[11] Patent Number: 5,196,480
[45] Date of Patent: Mar. 23, 1993

[54] THERMOPLASTIC MOLDING MATERIAL BASED ON GRAFT COPOLYMERS WITH BIMODAL PARTICLE SIZE DISTRIBUTION AND A TWO-STEP GRAFT SHELL

[75] Inventors: Friedrich Seitz, Friedelsheim; Karl Ruppmich, Ludwigshafen; Juergen Vietmeier, deceased, late of Neustadt, all of Fed. Rep. of Germany, by Karin Sperling-Vietmeier, executrix

[73] Assignee: BASF Aktiengesellschaft, Ludwigshafen, Fed. Rep. of Germany

[21] Appl. No.: 681,054

[22] Filed: Apr. 5, 1991

[30] Foreign Application Priority Data

Apr. 6, 1990 [DE] Fed. Rep. of Germany ....... 4011162

[51] Int. Cl.$^5$ ................ C08L 31/02; C08L 51/00; C08L 51/02
[52] U.S. Cl. .......................................... 525/71; 525/80
[58] Field of Search .................................. 525/71, 80

[56] References Cited

U.S. PATENT DOCUMENTS 4,224,419 9/1980 Swoboda et al. ...................... 525/71
4,788,253 11/1988 Hambrecht et al. .................. 525/85

FOREIGN PATENT DOCUMENTS 0074046 8/1982 European Pat. Off. .

Primary Examiner—Nathan M. Nutter
Assistant Examiner—Jeffrey Culpeper Mullis
Attorney, Agent, or Firm—Oblon, Spivak, McClelland, Maier & Neustadt

[57] ABSTRACT

Thermoplastic molding materials which have high gloss and are readily colored and comprise a first graft copolymer A of an elastomeric, crosslinked acrylate polymer as the graft base and a graft shell made from a vinyl-aromatic monomer and a polar, copolymerizable, ethylenically unsaturated monomer, and a second separately prepared graft copolymer B of an elastomeric crosslinked acrylate polymer as the graft base, which is different from that in A and has a larger mean particle diameter than the graft base of copolymer A, having a first graft shell of a vinyl-aromatic monomer and a second graft shell of a mixture of a vinyl aromatic monomer and a polar-copolymerizable, ethylenically unsaturated monomer, and a hard matrix C.

8 Claims, No Drawings

THERMOPLASTIC MOLDING MATERIAL BASED ON GRAFT COPOLYMERS WITH BIMODAL PARTICLE SIZE DISTRIBUTION AND A TWO-STEP GRAFT SHELL

The present invention relates to weather resistant, high-impact molding materials comprising particulate elastomers, namely graft polymers of acrylate polymers and styrene-acrylonitrile copolymers, which are readily colored and have high surface gloss.

High-impact thermoplastic molding materials are obtained from styrene-acrylonitrile copolymers by incorporating particulate rubber. This is generally effected by graft copolymerization of styrene and acylonitrile in the presence of the rubber, with or without subsequent blending of this graft product with a separately prepared hard component, the hard matrix, which generally comprises a styrene-acrylonitrile copolymer. Depending on the rubber used, the molding materials obtained have various property profiles.

The rubbers used in ABS polymers are diene polymers. These products have good impact resistance, in particular even at very low temperature, but have relatively low weathering and aging resistance If it is desired to obtain products which not only have high impact strength, but also simultaneously have good weathering and aging resistance, ethylenically unsaturated polymers must be avoided in the graft copolymerization. By contrast, rubber-elastic, preferably crosslinked acrylate polymers have proven suitable. The corresponding molding materials, which are also known as ASA polymers, are principally used for garden furniture, boats, signs, street lamp covers, etc, many applications requiring products with bright, brilliant colors.

The preparation of weathering and aging resistant ASA polymers is described, inter alia, in U.S. Pat. No. 3,055,859 and German Patent 1 260 135. In these processes, the graft base, a rubber-like acrylate polymer, is first prepared by emulsion polymerization of an acrylate of a monohydric alcohol having from 4 to 8 carbon atoms. The resultant latex has a mean particle diameter of less than 100 nm. A mixture of styrene and acrylonitrile is grafted, i.e. polymerized, onto the polyacrylate, preferably again in emulsion. In order to obtain ASA polymers having good mechanical properties, the polyacylate rubber serving as the graft base must be crosslinked; rubbers of this type are therefore prepared with addition of small amounts of bifunctional, crosslinking monomers.

An improvement in the ASA polymers disclosed in German Patent 1 260 135 is described in German Laid-Open Application DE-OS 19 11 882, in which the graft base employed is a coarse latex of a crosslinked acrylate polymer having a mean particle diameter of from 150 to 800 nm and a narrow particle size distribution. Compared with polymers prepared using fine polyacrylate latices, those containing coarse polyacrylate latices have improved notched impact strength, greater hardness and reduced shrinkage. The coarse graft copolymers have the disadvantage compared with fine graft copolymers of being more difficult to color; use of corresponding ASA polymers for the production of colored moldings is limited, i.e. only dull, pastel color shades are obtained, but not brilliant, bright colors without cloudiness.

DE 28 26 925 describes weathering resistant, high-impact thermoplastic molding materials which can readily be colored, comprising a first graft copolymer made from a crosslinked acrylate polymer and having a mean particle diameter of from about 50 to 150 nm, as the graft base and styrene and acrylonitrile as the graft shell, a second, separately prepared graft copolymer comprising a crosslinked acrylate polymer having a mean particle diameter of from about 200 to 500 nm, as the graft base and again styrene and acrylonitrile as the graft shell, and a hard component comprising a copolymer of styrene or α-methylstyrene with acrylonitrile; the weight ratio between the graft bases in the molding material is from about 90:10 to 35:65, and the proportion of the sum of the two graft bases is from about 10 to 35% by weight, based on the mixture.

These known materials are readily colored and have a notched impact strength well above that of the individual components. However, the surface quality achieved using these materials is inadequate for some applications in which high-gloss surfaces are required.

Proceeding from this prior art, we have found that the surface gloss can be improved while retaining the advantages, such as ease of coloring and high notched impact strength, if a second graft copolymer comprising from 50 to 80% by weight, preferably from 60 to 70% by weight, of a crosslinked acrylate polymer having a mean particle diameter of from about 200 to 700 nm is used as the graft base for a first graft shell, preferably comprising styrene, and a second graft shell comprising a mixture of a vinyl-aromatic monomer and a polar, copolymerizable, ethylenically unsaturated monomer in a weight ratio of from 90:10 to 60:40.

The preparation of graft copolymers of this type is known per se and is described, for example, in DE 31 49 358.

The invention accordingly relates to weathering resistant, high-impact thermoplastic molding materials which are readily colored and have high surface gloss, comprising A: a first graph copolymer A comprising
  A1: from 55 to 75% by weight, preferably from 60 to 70% by weight, based on A, of an elastomeric, crosslinked acrylate polymer A1 having a mean particle diameter (weight average) of from 50 to 150 nm as the graft base, and
  A2: from 45 to 25% by weight, preferably from 40 to 30% by weight, based on A, of a graft shell A2 made from a vinyl-aromatic monomer and a polar, copolymerizable, ethylenically unsaturated monomer in a weight ratio of from 80:20 to 65:35,
B: a second, separately prepared graft copolymer B comprising
  B1: from 50 to 80% by weight, preferably from 60 to 70% by weight, based on B, of an elastomeric, crosslinked acrylate polymer B1 which is different from A1 and has a mean particle diameter (weight average) in the range from 200 to 700 nm as the graft base,
  B2: a first graft shell B2 comprising from 5 to 30% by weight, preferably from 10 to 20% by weight, based on B, of a vinyl-aromatic monomer and
  B3: a second graft shell B3 comprising from 15 to 40% by weight, preferably from 20 to 30% by weight, based on B, of a mixture of a vinyl-aromatic monomer B31 and a polar, copolymerizable, ethylenically unsaturated monomer B32 in a B31:B32 weight ratio of from 90:10 to 60:40, and C: a hard matrix C comprising one or more copolymers of styrene, α-methylstyrene, acrylonitrile, methyl methacrylate and/or phenylmaleimide, where, according to the invention, the A1:B1 weight ratio of the graft bases is in the range from 95:5 to 35:65, and the proportion of A1 plus B1 in the graft bases is from 10 to 35% by weight, based on the molding material comprising A, B and C.

The term "graft shell" used above indicates all the respective graft branches polymerized onto the graft base. It is not intended to indicate any definition regarding spatial arrangement, i.e. it also includes graft branches which do not form any constituent of a shell around the graft base, but instead, for example, are spatially arranged inside the graft base.

In practice, the molding material according to the invention generally contains, as a further component D, conventional additives and auxiliaries in conventional and effective amounts, in particular suitable dyes and/or pigments.

Components A and B are each prepared separately graft copolymerizing a mixture of a vinyl-aromatic monomer and a polar, copolymerizable, ethylenically unsaturated monomer onto a crosslinked, rubber-like acrylate polymer. Since 100% grafting does not generally occur in the graft copolymerization, the product always contains a proportion of free, ungrafted copolymer. However, for the purposes of the invention, the term graft copolymer only indicates the rubber actually grafted. The proportion of graft copolymer in the product can be determined in a conventional manner by extracting the free ungrafted copolymer from the polymerization product, e.g. using methyl ethyl ketone, since the graft base is crosslinked and the graft copolymer is thus insoluble. The principle of the separation method is described, for example, in Moore, Moyer and Frazer, Appl. Polymer Symposia, page 67 ff (1968).

For the purposes of the present invention, the term "degree of grafting" is the percentage of chemically bonded styrene and acrylonitrile in the graft branches of the graft copolymer, based on the entire graft copolymer. The degree of grafting can easily be calculated from the analytically determined composition of the methyl ethyl ketone-insoluble gel.

The mean particle size according to the invention is in all cases the weight average particle size, as determined using an analytical ultracentrifuge by the method of W. Scholtan and H. Lange, Kolloid-Z. and Z.Polymere 250 (1972), pages 782 to 796. The ultracentrifuge measurement gives the integral weight distribution of the particle diameter of a sample. This can be used to derive the percentage by weight of particles having a diameter less than or equal to a certain value. The mean particle diameter, also known as the $d_{50}$ value of the integral weight distribution, is defined as the diameter greater than 50% by weight of the particles and less than the remaining 50% by weight. The width of the particle size distribution of the rubber particles is characterized using, in addition to the $d_{50}$ value (mean particle diameter), the $d_{10}$ and $d_{90}$ values determined from the integral weight distribution. The $d_{10}$ and $d_{90}$ values of the integral weight distribution are defined as for the $d_{50}$ value, with the difference that they relate to 10 and 90% by weight of the particles respectively. The quotient Q $$\frac{d_{90} - d_{10}}{d_{50}} = Q$$

is a measure of the width of the distribution of the particle sizes.

The graft copolymers A and B according to the invention are obtained in a conventional manner. Graft bases A1 and B1 are each crosslinked acrylate polymers of an appropriate type having a glass transition temperature of below 0° C. The crosslinked acrylate polymers should preferably have a glass transition temperature of less than −20° C., in particular less than −30° C. The glass transition temperature of the acrylate polymers can be determined, for example, by the DSC method (K. H. Illers, Makromol. Chemie 127 (1969), p. 1). Suitable monomers are alkyl acrylates having from 2 to 8 carbon atoms, preferably having from 4 to 8 carbon atoms, in the alkyl moiety. n-Butyl acrylate and ethylhexyl acrylate are particularly suitable. The monomers can each be employed alone or mixed with one another.

In order to obtained crosslinked acrylate polymers, the polymerization is carried out in the presence of from 0.5 to 10% by weight, preferably from 1 to 5% by weight, based on the total amount of monomers employed in the preparation of the graft base, of a copolymerizable, polyfunctional, crosslinking monomer. Suitable as such are monomers which preferably contain two, possibly more, ethylenic double bonds which are capable of copolymerization and are not conjugated in the 1,3-position. Examples of suitable monomers are divinylbenzene, diallyl maleate, diallyl fumarate and diallyl phthalate. Tricyclodecenyl acrylate has proven particularly suitable (cf. German Patent 1 260 935, which also describes the preparation given below).

First, the graft base A1 is prepared by polymerizing the acrylate(s) and the crosslinking monomer, if desired together with further comonomers, in aqueous emulsion in a conventional manner. The conventional emulsifiers, in amounts of from 0.5 to 5% by weight, based on the monomers, are used. The sodium salts of alkylsulfonates or fatty acids having from 10 to 18 carbon atoms are preferred. In general, a water:monomer ratio of 2:1 to 0.7:1 is used. Suitable polymerization initiators are conventional persulfates, e.g. potassium persulfate, but it is also possible to use redox systems. As further polymerization aids, conventional buffers and possibly molecular weight regulators, such as mercaptans, terpinols or dimeric α-methylstyrene, can be used.

The precise polymerization conditions, in particular the type, metering rate and amount of the emulsifier, are selected so that the latex obtained has a $d_{50}$ value in the range of from about 50 to 150 nm, preferably in the range from 80 to 100 nm. The particle size distribution of the latex should preferably be narrow. The quotient $Q=(d_{90}-d_{10})/d_{50}$ should be less than 0.5, if possible less than 0.35. This is achieved, for example, by ensuring that the monomer and emulsifier concentration and the temperature are constant during the polymerization.

To prepare the graft copolymer (A), the vinyl-aromatic compound, i.e. styrene, α-methylstyrene or ring-alkylated styrene, and the polar, copolymerizable, ethylenically unsaturated monomers, i.e. acrylonitrile, alkyl methacrylate having from 1 to 4 carbon atoms in the alkyl moiety, acrylic acid, maleic anhydride, acrylamide or vinyl methyl ether, are then polymerized, advantageously again in aqueous emulsion, onto the graft base in the form of a latex (i.e. emulsion). The graft copolymerization can be carried out in the same system as the emulsion polymerization for the preparation of the graft base, it being possible, if necessary, to add further emulsifier and initiator. The monomer mixture to be grafted on can be added to the reaction mixture in one batch, in portions or preferably continuously during the polymerization. The graft copolymerization is carried out in such a manner that a degree of grafting of from 25 to 45% by weight, preferably from 30 to 40% by weight, results in the graft copolymer A. Since the graft yield in the graft copolymerization is not 100%, a somewhat larger amount of the monomer mixture must be employed in the graft copolymerization than corresponds to the desired degree of grafting. The graft yield in the graft copolymerization and thus the degree of grafting of the finished graft copolymer A can be controlled, for example, by means of the metering rate of the monomers or by adding regulator (Chauvel, Daniel, ACS Polymer Preprints 15 (1974) page 329 ff). The proportion of the graft copolymer A in the polymerization product is determined as described.

The graft base B1 employed for the preparation of the second graft copolymer B is likewise a crosslinked acrylate polymer. That stated above also applies to the nature and manner of the preparation of the graft base B1.

In constrast to the crosslinked acrylate polymer used as the graft base A1, the crosslinked acrylate polymer B1 should consist of coarse particles, i.e. should have a mean particle diameter (weight average) in the range of from about 200 to 700 nm, preferably in the range from 250 to 500 nm. It is desirable for the coarse, crosslinked acrylate polymer B2 to have a narrow particle size distribution, it being favorable for the quotient $Q = (d_{90} - d_{10})/d_{50}$ to be less than 0.3, preferably less than 0.2. Coarse, crosslinked acrylate polymers which are suitable as the graft base B1 can be obtained by conventional processes for the preparation of coarse dispersions, but expediently by the seed latex method, as described in German Patent 1 911 882 for the preparation of ASA polymers In this method, a fine, crosslinked acrylate polymer latex, preferably having a mean particle diameter of less than 120 nm, obtained as described by emulsion polymerization of an acrylate, crosslinking monomers and, if desired, further comonomers, is subjected to further polymerization by adding further monomers and emulsifier. The conditions here (cf. Journal of Applied Polymer Science, Vol. 9 (1965), pages 2929 to 2938) are adjusted so that only the polymer particles of the seed latex grow further, but no new latex particles are formed. The particle size of the resultant coarse latex can be adjusted in the desired manner by varying the seed latex:monomer mixing ratio.

The second graft copolymer B according to the invention is prepared using first a vinyl-aromatic monomer, in particular styrene, furthermore α-methylstyrene, or a ring-alkylated styrene, such as p-methylstyrene or tert-butylstyrene, in the presence of the coarse latex B1 prepared beforehand.

The graft copolymerization can expediently be carried out in the same system as the emulsion polymerization for the preparation of the graft base A, adding further emulsifier and initiator if necessary. The monomer to be graft on, i.e., in particular, styrene, can be added to the reaction mixture in one batch, in several portions or preferably continuously during the polymerization. The graft polymerization is carried out in such a manner that a degree of grafting of 2.5 to 25% by weight, preferably from 15 to 20% by weight, results in the graft copolymer B. In the second step, the graft copolymerization is then continued with a monomer mixture, i.e. one or more vinyl-aromatic monomers or styrene and one or more copolymerizable, polar monomers or acrylonitrile, in a ratio of from 90:10 to 60:40, preferably from 75:25 to 65:35. Examples of vinyl-aromatic monomers have already been mentioned in the description of the first grafting step. An example of a polar, copolymerizable, ethylenically unsaturated monomer is acrylonitrile. Besides acrylonitrile, it is also possible to use an alkyl methacrylate having from 1 to 4 carbon atoms in the alkyl moiety, acrylic acid, maleic anhydride, acrylamide and/or vinyl methyl ether. Preference is given to acrylonitrile, ethyl acrylate, methyl methacrylate and mixtures thereof. Particular preference is given, in the 2nd grafting step, to styrene and acrylonitrile, furthemore α-methylstyrene and acrylonitrile, and styrene, acrylonitrile and methyl methacrylate. The second graft copolymerization step is expediently also carried out in the present system; if necessary, further emulsifier and initiator can be added. The monomer mixture to be grafted on can either be added in one batch, in portions or preferably continuously. The graft copolymerization is carried out in such a manner that a degree of grafting of from 10 to 45% by weight, preferably from 15 to 40% by weight results in the graft copolymer B.

Besides the two graft copolymers A and B, the mixtures according to the invention contain a hard component (hard matrix) comprising one or more homopolymers or copolymers of styrene, α-methylstyrene, acrylonitrile, methyl methacrylate and/or phenylmaleimide. This hard component C also includes free, i.e. ungrafted, copolymers produced in the graft copolymerization from vinyl-aromatic monomers and polar monomers.

This hard component C can thus be, for example, a polymethyl methacrylate, a styrene-acrylonitrile copolymer, an α-methylstrene-acrylonitrile copolymer, a styrene-α-methylstyrene-acrylonitrile copolymer or a styrene-acrylonitrile-methyl methacrylate copolymer.

For the hard component, these polymers can be employed individually or mixed with one another, so that the hard component C can be, for example, a mixture of a styrene-acrylonitrile copolymer and an α-methylstyrene-acrylonitrile copolymer.

If the hard component C comprises a mixture of a styrene-acrylonitrile copolymer and an α-methylstyrene-acrylonitrile copolymer, the acrylonitrile contents in the two copolymers should as far as possible not differ by more than 10% by weight, preferably by not more than 5% by weight. The hard component C can also comprise only a single styrene-acrylonitrile copolymer, namely when the graft copolymerization for the preparation of components A and B and the preparation of the hard component C start from the same monomer mixture of styrene and acrylonitrile.

The hard component C can be obtained in a conventional manner. Thus, the copolymerization of the styrene and/or α-methylstyrene with the acrylonitrile can be carried out in bulk, solution, suspension or aqueous emulsion. The hard component preferably has a viscosity number of from 40 to 100, in particular from 50 to 80. The viscosity number is determined by the procedure of DIN 53 726; it is based on a concentration of 0.5 g in 100 ml of dimethylformamide.

The blending of the separately prepared hard component C with the product obtained from the graft copolymerization to give the materials according to the invention can be carried out, for example, by first mixing some of component C with A, mixing the remainder with B, and then combining the two part mixtures.

However, it is also possible to first mix components A and B and then to incorporate C. A, B and C are expediently used here in such mixing ratios that the two crosslinked acrylate polymers A1 and B1 serving as the graft base are present in the final mixture in a A1:B1 weight ratio of from about 95:5 to 35:65, preferably from 95:5 to 50:50 and, in addition, the proportion of the two crosslinked acrylate polymers together (A1+B1) in the final mixture (A+B+C) is from 10 to 35% by weight, preferably from 15 to 30% by weight, based on the mixture.

The mixing can be carried out in any desired manner. If using emulsion polymers, it is possible to mix the polymer dispersions with one another, then to precipitate and work up the product. However, the mixing is preferably carried out by joint extrusion, kneading or rolling, the individual constituents having been isolated beforehand if necessary. It is also possible to remove some of the water from the product obtained from aqueous dispersion and to mix the moist crumbs with the hard component C, complete drying then being carried out during the mixing.

The mixtures according to the invention may contain conventional additives and/or auxiliaries D, as are conventional and customary for ASA polymers, for example fillers, further compatible plastics, antistatics, antioxidants, flameproofing agents and lubricants. Additives and auxiliaries are added in conventional and effective amounts, preferably from 0.1 to a total of about 30% by weight, based on the mixture (A+B+C).

Articles produced from the materials according to the invention have high surface gloss, which, for the purposes of the present invention, is the reflectivity of the surface for visible light. Use of the materials according to the invention gives articles whose reflectivity is significantly higher than those obtained using molding materials as described in DE 28 26 925, although the latter do have good reflectivity.

The molding materials according to the invention also have advantages over those described in DE 28 26 925 with respect to the ease of coloring. These advantages are apparent, in particular, in moldings with complicated shapes and dark colors. Even under unfavorable conditions, homogeneously colored surfaces are obtained when molding materials according to the invention are used.

For the purposes of the invention, ease of coloring is the achievement of brilliant color shades using the smallest possible amounts of pigment. The materials according to the invention can therefore contain, in particular, dyes or pigments as additives D. The dyes or pigments are usually added in amounts of from about 0.02 to about 10% by weight, preferably from 0.2 to 5% by weight, based on A+B+C. Examples of suitable dyes and pigments are cadmium sulfide, copper phthalocyanine, iron oxides and finely divided carbon blacks. The colored moldings have an excellent color effect, it being possible to obtain bright, brilliant shades without cloudiness or gray streaks. In addition, the moldings have virtually no differing color shade in the area of the sprue and weld line, an undesired effect observed to a pronounced degree in injection molding of colored ASA polymers using fine graft copolymers as component A. Instead, the injection-molded, colored materials according to the invention have good levelness of color around the sprue mark and the weld line.

The material according to the invention can be subjected to conventional processing for thermoplastics, e.g. extrusion and injection molding, to give a wide variety of moldings, e.g. garden furniture, boats, signs, street lamp covers and toys.

The mean particle size and particle size distribution given above were determined by the abovementioned method from the integral weight distribution. The graft yield, and thus the proportion of graft copolymer in the product obtained from the graft copolymerization were determined by extraction with methyl ethyl ketone at 25° C. The degree of grafting, i.e. the percentage of grafted styrene and acrylonitrile present in the graft copolymer, is most easily determined from the microanalytical determination of nitrogen (from acrylonitrile) and oxygen (from the acrylate) in the methyl ethyl ketone-insoluble gel. The notched impact strength of the materials was determined in accordance with DIN 53 453 on small standard injection-molded specimens at 23° C. The injection temperature for the specimens was 250° C.

To measure the gloss, test specimens were injection molded at various material temperatures. The gloss measurements were carried out using a Dr. Lange UME3 reflectometer at an incident angle of 45°.

In the examples below, amounts are by weight.

a) Preparation of the fine graft copolymer A a1) 16 parts of butyl acrylate and 0.4 part of tricyclodecenyl acrylate were warmed to 60° C. with stirring in 150 parts of water with addition of 1 part of the sodium salt of a $C_{12}$- to $C_{18}$-paraffinsulfonic acid, 0.3 part of potassium persulfate, 0.3 part of sodium bicarbonate and 0.15 part of sodium pyrophosphate. 10 minutes after the reaction had started, a mixture of 82 parts of butyl acrylate and 1.6 parts of tricyclodecenyl acrylate were added over the course of 3 hours. The reaction was then allowed to proceed without intervention for a further hour. The latex obtained had a solids content of 40% by weight. The mean particle size (weight average) was determined as being 76 nm. The particle size distribution was narrow (quotient Q=0.29).

a2) 150 parts of the latex obtained as in a1) were mixed with 40 parts of a mixture of styrene and acrylonitrile (weight ratio 75:25) and 60 parts of water, a further 0.03 part of potassium persulfate and 0.05 part of lauroyl peroxide were added, and the mixture was heated at 65° C. for 4 hours with stirring. The product was then precipitated using calcium chloride solution at 95° C., washed with water and dried in a stream of warm air. The degree of grafting of the graft copolymer was 35%.

b) Preparation of the coarse graft copolymer BI b1) 50 parts of water and 0.1 part of potassium persulfate were added to 2.5 parts of the latex prepared as described in a1), and, over the course of 3 hours, on the one hand a mixture of 49 parts of butyl acrylate and 1 part of tricyclodecenyl acrylate and on the other hand a solution of 0.5 part of the sodium salt of a $C_{12}$- to $C_{18}$-paraffinsulfonic acid in 25 parts of water were added. The temperature during this addition was 60° C. When the addition was complete, the polymerization was continued for a further two hours. The resultant latex had a solids content of 40%. The mean particle size (weight average) of the latex was determined as being 410 nm.

b2) 150 parts of a latex obtained as in b1) were mixed with 20 parts of styrene and 60 parts of water, a further 0.03 part of potassium persulfate and 0.05 part of lauroyl peroxide were added, the mixture was heated at 65° C. for 3 hours with stirring. The dispersion obtained was polymerized for a further 4 hours with 20 parts of a mixture of styrene and acrylonitrile in the ratio 75:25, the product was precipitated using calcium chloride solution at 95° C., separated off, washed with water and dried in a stream of warm air. The degree of grafting was determined as being 35%.

c) Preparation of a coarse graft copolymer (comparative experiment, component BII)

150 parts of a latex obtained as in b1) were mixed with 40 parts of a mixture of styrene and acrylonitrile in the ratio 75:25 and 60 parts of water, a further 0.03 part of potassium persulfate and 0.05 part of lauroyl peroxide were added, and the mixture was heated at 65° C. for 4 hours with stirring. The product was then precipitated using a calcium chloride solution at 95° C., separated off, washed with water and dried in a stream of warm air. The degree of grafting of the graft copolymer was determined as being 32%.

d) Preparation of the hard component C

A monomer mixture of styrene and acrylonitrile was polymerized in solution under conventional conditions. The styrene-acrylonitrile copolymer obtained had an acrylonitrile content of 35% and a viscosity number of 80 ml/g.

e) Preparation of the mixtures

First, the graft products prepared as in a) to c) were mixed separately with the styrene-acrylonitrile copolymer prepared as in d) in the ratio 1:1 in an extruder at 280° C.

From these premixes, the mixtures shown in the table below were then prepared using further hard component C. The blending was again carried out in an extruder at 280° C., with addition of 1% of a lubricant (diethyl phthalate) and 1% of a dye (cadmium red).

The results are likewise given in the table. Compared with the comparative experiment, the notched impact strength of the molding material according to the invention is slightly increased. It is decisive that the gloss measured in the example according to the invention is considerably higher than in the comparative experiment. This applies to the entire range of material temperatures during injection molding, by which ASA polymers are conventionally processed.

TABLE 1

| | Example according to the invention | Comparative experiment |
|---|---|---|
| Component | | |
| A | 18 parts | 18 parts |
| BI | 12 parts | — |
| BII | — | 12 parts |
| C | 70 parts | 70 parts |
| Notched impact strength [kJ/m$^2$] | 8.5 | 7.5 |
| Gloss [% reflection] | | |
| Material temp. | | |
| 230° C. | 55 | 48 |
| 255° C. | 35 | 27 |

TABLE 1-continued

| | Example according to the invention | Comparative experiment |
|---|---|---|
| 280° C. | 19 | 13 |

We claim:
1. A thermoplastic molding material containing
   A. a first graft copolymer A comprising
      A1: from 55 to 75% by weight, based on A, of an elastomeric, crosslinked acrylate polymer A1 having a mean particle diameter (weight average) of from 50 to 150 nm as the graft base, and
      A2: from 45 to 25% by weight, based on A, of a graft shell A2 made from a vinyl-aromatic monomer and a polar, copolymerizable, ethylenically unsaturated monomer in a weight ratio of from 80:20 to 65:35,
   B: a second, separately prepared graft copolymer B comprising
      B1: from 50 to 80% by weight, based on B, of an elastomeric, crosslinked acrylate polymer B1 which is different from A1 and has a mean particle diameter (weight average) in the range from 200 to 700 nm as the graft base,
      B2: a first graft shell B2 comprising from 5 to 30% by weight, based on B, of a vinyl-aromatic monomer and
      B3: a second graft shell B3 comprising from 15 to 40% by weight, based on B, of a mixture of a vinyl-aromatic monomer B31 and a polar, copolymerizable, ethylenically unsaturated monomer B32 in a B31:B32 weight ratio of from 90:10 to 60:40, and
   C: a hard matrix C comprising a copolymer or mixture of two copolymers prepared from monomers selected from the group consisting of styrene, α-methylstyrene, acrylonitrile, methyl methacrylate and phenylmaleimide,
   wherein the A1:B1 weight ratio of the graft bases is in the range from 95:5 to 35:65, and the proportion of A1 plus B1 in the graft bases is from 10 to 35% by weight, based on the molding material comprising A, B and C.

2. A molding material as claimed in claim 1, whose first graft copolymer A has been obtained from a graft base A1 having a mean particle diameter (weight average) in the range from 60 to 100 nm.

3. A molding material as claimed in claim 2, whose first graft copolymer A comprises from 60 to 70% by weight of the graft base A1 and from 40 to 30% by weight of the graft shell A2 made from styrene and a polar, copolymerizable, ethylenically unsaturated monomer.

4. A molding material as claimed in claim 1, whose second graft copolymer B has been obtained from a graft base B1 having a mean particle diameter (weight average) in the range from 250 to 500 nm.

5. A molding material as claimed in claim 4, whose second graft copolymer B comprises from 60 to 70% by weight of the graft base B1, from 10 to 20% by weight of styrene B2 and from 20 to 30% by weight of the mixture B3 of styrene and acrylonitrile.

6. A molding material as claimed in claim 1, containing A and B in such an amount that the A1:B1 weight ratio is from 95:5 to 50:50.

7. A molding material as claimed in claim 6, containing A, B and C in such an amount that the proportion of A1 and B1 together is from 15 to 30% by weight, based on the molding material comprising A, B and C.

8. A molding material as claimed in claim 1, containing, as auxiliary D, a dye or colored pigment.

* * * * *